(12) United States Patent
Mody et al.

(10) Patent No.: US 11,341,606 B2
(45) Date of Patent: *May 24, 2022

(54) DOWN SCALING IMAGES IN A COMPUTER VISION SYSTEM

(71) Applicant: Texas Instruments Incorporated, Dallas, TX (US)

(72) Inventors: Mihir Narendra Mody, Bangalore (IN); Brian Chae, Duluth, GA (US); Shashank Dabral, Allen, TX (US); Niraj Nandan, Plano, TX (US); Hetul Sanghvi, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,543

(22) Filed: Jul. 16, 2020

(65) Prior Publication Data
US 2020/0349671 A1 Nov. 5, 2020

Related U.S. Application Data

(63) Continuation of application No. 15/143,491, filed on Apr. 29, 2016, now Pat. No. 10,755,380.

(Continued)

(51) Int. Cl.
*G06K 9/32* (2006.01)
*G06T 3/40* (2006.01)
(Continued)

(52) U.S. Cl.
CPC .................. *G06T 3/40* (2013.01); *G06T 1/20* (2013.01); *G06T 3/4023* (2013.01); *H04N 1/393* (2013.01);
(Continued)

(58) Field of Classification Search
CPC .... G06T 1/20; G06T 1/60; G06T 3/40; G06T 3/4023; G06T 3/4053; G06T 3/4092;
(Continued)

(56) References Cited

U.S. PATENT DOCUMENTS 6,009,447 A 12/1999 Kubota
6,018,597 A 1/2000 Maltsev
(Continued)

FOREIGN PATENT DOCUMENTS

CN 102222317 A 10/2011
CN 103026368 A 4/2013

OTHER PUBLICATIONS

1st CN Office Action With Search Report; PRC (China) Pat. Appln. No. 201611040139.4; dated May 8, 2021.
(Continued)

*Primary Examiner* — Eric Rush
(74) *Attorney, Agent, or Firm* — Ebby Abraham; Charles A. Brill; Frank D. Cimino

(57) ABSTRACT

An apparatus for scaling images is provided that includes at least two input ports, a scaling component coupled to the at least two input ports, the scaling component including a plurality of scalers, the scaling component configurable to map any scaler to any input port of the at least two input ports and configurable to map more than one scaler to any input port, and a memory coupled to the at least two input ports and to outputs of the plurality of scalers, the memory configured to store image data for each input port and scaled image data output by the plurality of scalers.

11 Claims, 9 Drawing Sheets

Related U.S. Application Data

(60) Provisional application No. 62/254,053, filed on Nov. 11, 2015.

(51) Int. Cl.
*G06T 1/20* (2006.01)
*H04N 1/393* (2006.01)

(52) U.S. Cl.
CPC . *H04N 1/3935* (2013.01); *G06T 2207/20016* (2013.01); *G09G 2340/0407* (2013.01)

(58) Field of Classification Search
CPC ...... G06T 2207/20016; G06T 2200/28; G06K 9/00973; G06K 9/00986; G06K 9/527; G06K 9/6857; G09G 5/391; G09G 2340/04; G09G 2340/0407; G09G 2340/0414; G09G 2340/0421; H04N 1/387; H04N 1/3875; H04N 1/393; H04N 1/3935; H04N 1/40068; H04N 5/2628; H04N 19/436; H04N 19/439; H04N 19/59; H04N 21/440263
USPC ....... 382/276, 277, 298, 299, 302–304, 307; 348/390.1, 441, 581; 700/2, 4, 5; 345/660, 667–670, 472, 472.1, 501, 502, 345/505, 506, 519, 541, 545; 358/451; 708/208, 234, 253, 313
See application file for complete search history.

(56) References Cited

U.S. PATENT DOCUMENTS

| | | | |
|---|---|---|---|
| 6,091,426 A | 7/2000 | Hauck et al. | |
| 6,724,948 B1* | 4/2004 | Lippincott | G06T 3/4023 382/298 |
| 6,903,733 B1 | 6/2005 | Greenberg | |
| 7,194,114 B2 | 3/2007 | Schneiderman | |
| 7,609,326 B2* | 10/2009 | Jen | G06T 3/4007 382/298 |
| 7,667,718 B2* | 2/2010 | Hsu | G06T 3/4092 345/668 |
| 7,783,125 B2* | 8/2010 | Lim | G06T 5/004 382/265 |
| 7,941,001 B1 | 5/2011 | Sahu | |
| 8,417,066 B2* | 4/2013 | Zhong | G06T 3/4007 382/300 |
| 8,712,162 B2* | 4/2014 | Kirsch | G06T 7/00 382/264 |
| 8,804,040 B2 | 8/2014 | Garg | |
| 9,275,434 B2 | 3/2016 | Lin | |
| 10,255,659 B2* | 4/2019 | Bogusz | G06T 3/40 |
| 2003/0122960 A1 | 7/2003 | Lafon | |
| 2005/0163389 A1 | 7/2005 | Ohmi | |
| 2006/0012714 A1* | 1/2006 | Louie | G06T 3/4023 348/581 |
| 2007/0104394 A1 | 5/2007 | Chou | |
| 2009/0003730 A1 | 1/2009 | Pande | |
| 2009/0135310 A1 | 5/2009 | Kim | |
| 2009/0256859 A1 | 10/2009 | Komorowski | |
| 2010/0124361 A1 | 5/2010 | Gaddy | |
| 2010/0169576 A1 | 7/2010 | Chen | |
| 2010/0315556 A1 | 12/2010 | Lin | |
| 2012/0027290 A1 | 2/2012 | Baheti et al. | |
| 2012/0182442 A1* | 7/2012 | Kirsch | H04N 5/23229 382/170 |
| 2013/0223764 A1 | 8/2013 | Tripathi | |
| 2013/0243330 A1* | 9/2013 | Chiu | G06K 9/6857 382/195 |
| 2013/0301930 A1 | 11/2013 | Vigliar | |
| 2013/0301931 A1 | 11/2013 | Vigliar | |
| 2014/0301488 A1 | 10/2014 | Baylon | |
| 2016/0063727 A1 | 3/2016 | Gao | |
| 2016/0098812 A1 | 4/2016 | Yoon | |
| 2016/0239941 A1 | 8/2016 | Lee | |

OTHER PUBLICATIONS

Xiangdong Fu, "Understanding the DaVinci Resizer", Application Report, SPRAA17B, Texas Instruments, Jul. 2008, pp. 1-30.

Gaurav Mishra et al., "Real-Time Image Resizing Hardware Accelerator for Object Detection Algorithms", 2013 International Symposium on Electronic System Design (ISED), Singapore, Dec. 10-12, 2013, pp. 98-102.

Mihir Mody et al., "High Performance Front Camera ADAS Applications on TI's TDA3X Platform", 2015 IEEE 22nd International Conference on High Performance Computing (HiPC), Bangalore, Karnataka, India, Dec. 16-19, 2015, pp. 456-463.

Mihir Mody and Brian Chae, "VPAC Mulit-Scaler (MSC) HWA", VPAC Multi-Scaler Specification (v0.8.0), Jan. 15, 2015, pp. 1-89.

* cited by examiner

DOWN SCALING IMAGES IN A COMPUTER VISION SYSTEM

CROSS-REFERENCE TO RELATED APPLICATIONS

This application is a continuation of U.S. patent application Ser. No. 15/143,491, filed Apr. 29, 2016, which claims benefit of U.S. Provisional Patent Application No. 62/254,053 filed Nov. 11, 2015, both of which are incorporated herein by reference in their entirety.

BACKGROUND OF THE DISCLOSURE

Field of the Disclosure

Embodiments of the present disclosure generally relate to computer vision systems, and more specifically relate to down scaling images in computer vision systems.

Description of the Related Art

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems rely on computer vision processing to detect objects in the field of view of one or more cameras. Multi-resolution decomposition of an image, i.e., down scaling of an image in differing resolutions, to generate a pyramid of images of differing resolutions is a fundamental operation in computer vision applications. The image pyramid enables analysis of the scene captured in the original image at different "sizes", e.g., over different distances. Current approaches to scaling of an image may be undesirable for embedded ADAS applications due to large memory requirements for software approaches and large silicon area requirements for hardware approaches.

SUMMARY

Embodiments of the present disclosure relate to methods and apparatus for down scaling of images in a computer vision system. In one aspect, an apparatus for scaling images is provided that includes at least two input ports, a scaling component coupled to the at least two input ports, the scaling component including a plurality of scalers, the scaling component configurable to map any scaler to any input port of the at least two input ports and configurable to map more than one scaler to any input port, and a memory coupled to the at least two input ports and to outputs of the plurality of scalers, the memory configured to store image data for each input port and scaled image data output by the plurality of scalers.

In one aspect, an apparatus for scaling images is provided that includes at least one input port, a scaling component coupled to the at least one input port, the scaling component including a plurality of scalers, wherein each scaler of the plurality of scalers includes a vertical scaling filter and a horizontal scaling filter, wherein each scaler is configured such that the vertical scaling filter is applied to input image data and the horizontal scaling filter is applied to output image data of the vertical scaling filter, and a memory coupled to the at least one input port and to outputs of the plurality of scalers, the memory configured to store image data for the at least one input port and scaled image data output by the plurality of scalers.

In one aspect, a method for scaling images in an image scaler is provided that includes configuring a first plurality of scalers in the image scaler such that a scaler of the first plurality of scalers generates a initial octave of an image pyramid based on an input base image and remaining scalers of the first plurality of scalers each generate a respective intra-octave scaled image between the initial octave and the base image based on the input base image, scaling the input base image in each scaler of the first plurality of scalers to generate the initial octave and the respective intra-octave scaled images, and storing the next octave and the respective intra-octave scaled images.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
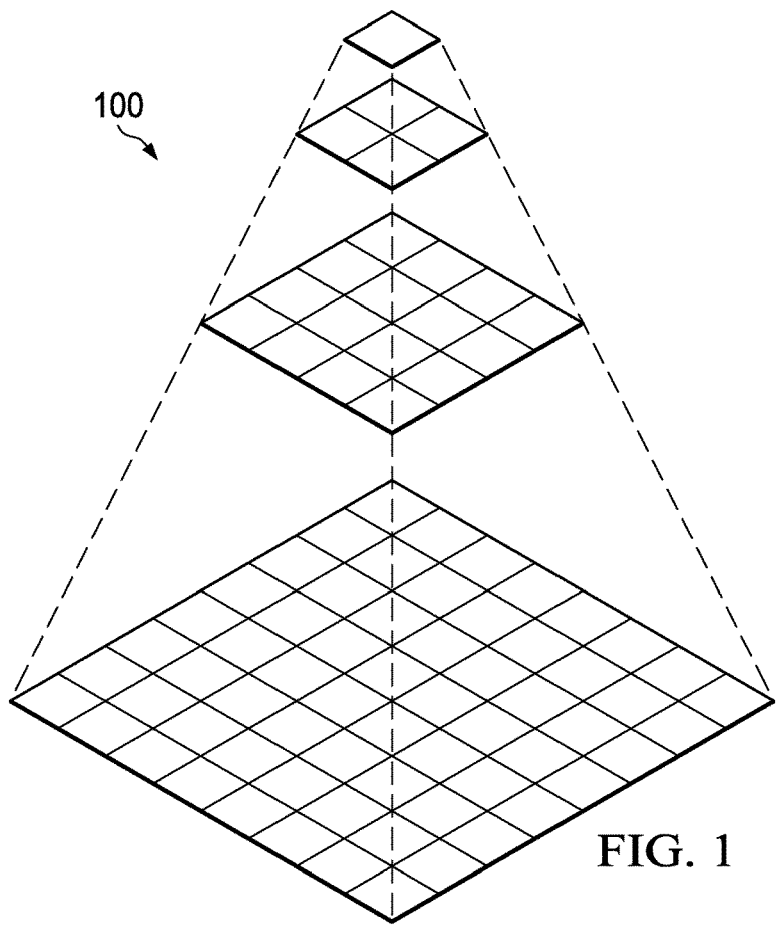
FIG. 1 is an example of an image pyramid.

Specific embodiments of the disclosure will now be described in detail with reference to the accompanying figures. Like elements in the various figures are denoted by like reference numerals for consistency.

As previously mentioned, the computer vision processing performed in camera-based embedded safety systems requires the generation of image pyramids, i.e., a hierarchy of down-sampled images of decreasing resolution generated from high resolution input. An image pyramid or pyramids may be generated for an image based on the particular vision algorithm(s) used. For example, the image pyramid may be a set of images in which each image is down-sampled by a factor of two both horizontally and vertically with respect to the image of the next higher resolution in the pyramid. In such a pyramid, each image is referred to as an octave. FIG. 1 is an example of such a pyramid.

For some algorithms, down-sampled images are also generated between each octave of the pyramid. The scale ratios used to generate the down-sampled images between octaves, i.e., the intra-octave scaled images, may be arbitrary. For example, for pedestrian detection and object detection in an automotive safety system, the ratios used for the between octave scaling may be between 1 and 2, e.g., 1.1, $1.1^2$, etc., and the number of scaled images between each octave may be eight. Assuming an image pyramid of six octaves, 5*8=40 scaled outputs are generated for a single input image.

Figure 2:
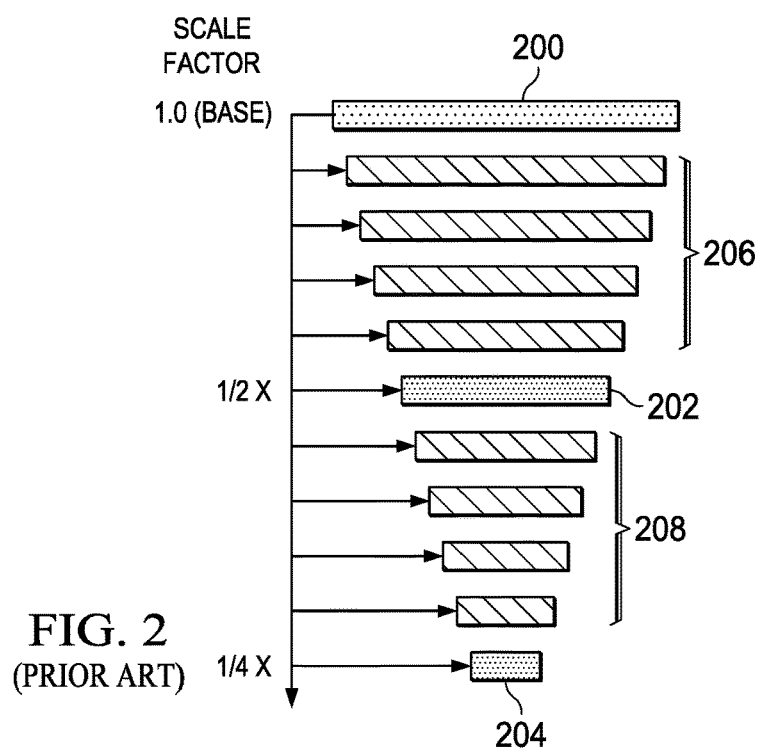
FIG. 2 is an example illustrating an approach to generating an image pyramid.

A common software approach to image scaling is included in OpenCV (Open Source Computer Vision library). OpenCV is a widely used open source computer vision and machine learning software library that includes support for real-time computer vision processing. In OpenCV, the generation of a pyramid such as that of FIG. 1 includes, for each image layer, convolving the previous layer with a Gaussian kernel and removing each even-number row and column from the result. Each image layer (octave) is generated sequentially by calling a single down-sampling function with the previous higher resolution layer as input. In addition, in OpenCV, generic scaling of images such as that need for generation of the intra-octave scaled images is performed by sequentially calling a single resizing function. The down sampling for the generic scaling may use bilinear, bicubic, spline, or Lancoz filtering. FIG. 2 is an example illustrating the typical pyramid generation using OpenCV. As this example shows, all octaves, e.g., octaves 202, 204, of the pyramid and all intra-octave scaled images, e.g., scaled images 206, 208, are generated serially from the base image 200.

Figure 3:
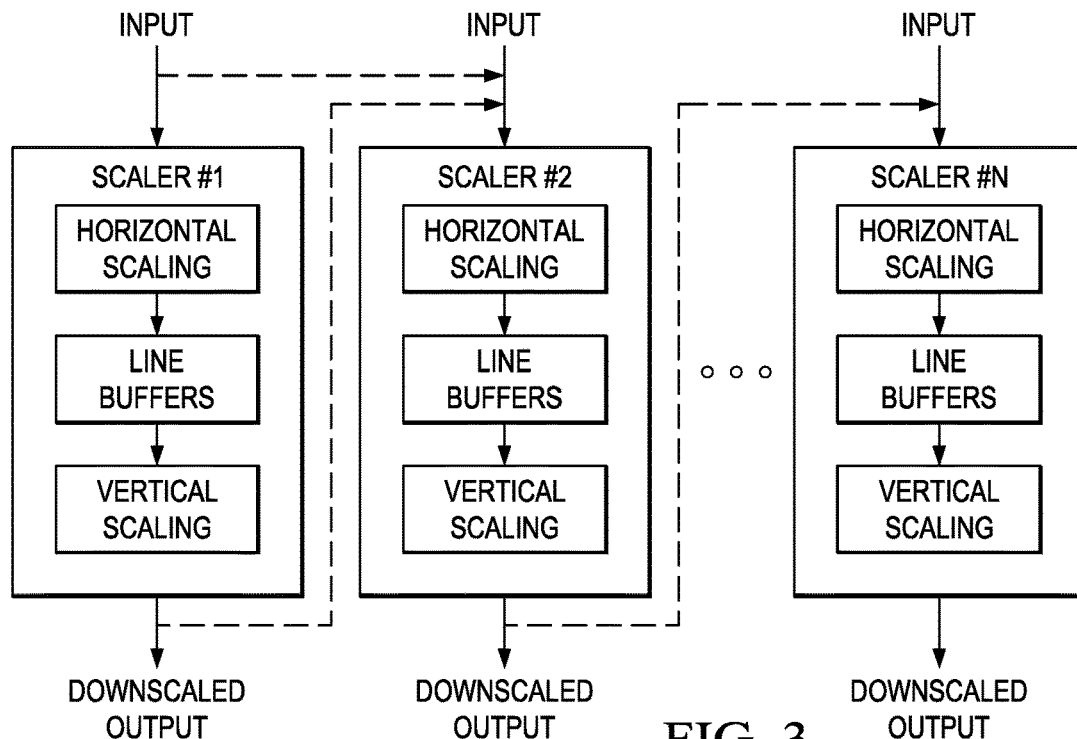
FIG. 3 is a prior art example of multiple independent scalers with a single input thread.
Figure 4:
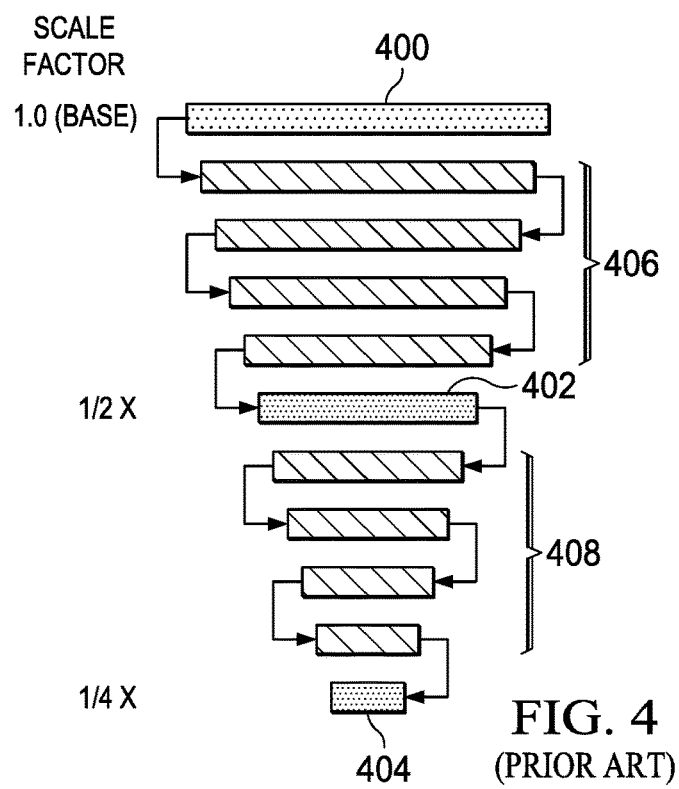
FIG. 4 is an example illustrating an approach to generating an image pyramid.

A common hardware approach used to support the required image scaling is to implement a number of independent image re-sizers or scalers with a single input thread. The number of hardware scalers included in a system may vary and may be chosen based on factors such as throughput requirements and cost. FIG. 3 is an example illustrating such a prior art approach. Each of the scalers may have the same input and may be independently programmed to generate downscaled outputs at different resolutions. Alternatively, the scalers may be operated in sequence, i.e., in a cascade, such that the downscaled output of a scaler is the input of the next scaler in the sequence. In either case, multiple passes through the scalers may be used if the number of scalers is less than the number of desired scaled images. FIG. 4 is an example illustrating the typical pyramid generation using multiple scalers as a cascade. As this example shows, the intra-octave scaled image with the highest resolution is generated from the base image 400, and each octave, e.g., octaves 402, 404, and each intra-octave scale image, e.g., scaled images 406, 408, is generated from the next higher resolution scaled image.

As illustrated in the example of FIG. 3, each scaler performs horizontal scaling on some number of consecutive rows of an image and stores the results in line buffers. The number of consecutive rows processed and the number of line buffers depends on the number of taps of the filter used for vertical scaling. Vertical scaling is then performed on the contents of the line buffers. The horizontal and vertical scaling is repeated until all rows of an input image have been processed.

Embodiments of the disclosure provide for multi-thread image scaling using multiple scalers that may be shared among the multiple threads. More specifically, all of the scalers may be used by one thread or the scalers may be partitioned among two or more of the input threads. In addition, in some embodiments, each scaler performs the vertical scaling before the horizontal scaling, eliminating the need for line buffers in each scaler. Further, in some embodiments, unified polyphase filtering is provided in which the filter taps for a phase can be tuned for octave scaling at an integer ratio as well as generic scaling at arbitrary fractions. That is, any kind of interpolation may be simulated, e.g., Gaussian, bilinear, bicubic, Lancoz, etc. Also, in some embodiments, dual precision modes, e.g., 1/64 and 1/32, are provided for the down scaling ratio to handle the typical case of identical horizontal and vertical ratios with no change in aspect ratio and scaling with change in aspect ratio.

Figure 5:
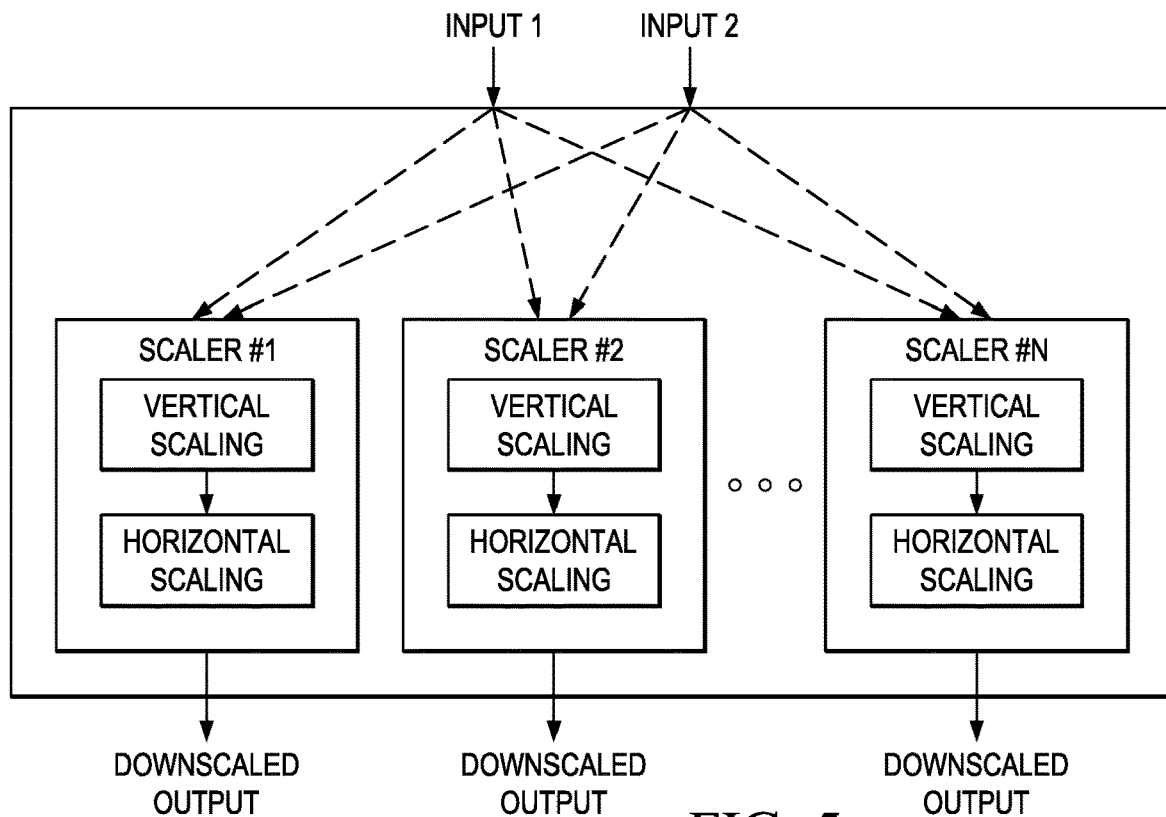
FIG. 5 is a block diagram of an example multi-thread image scaler with multiple scalers.

FIG. 5 is an example illustrating an embodiment of a multi-thread image scaler with multiple scalers. In this example, the number of input threads is assumed to be two. One of ordinary skill in the art will understand embodiments in which there are more input threads. The set of N scalers is shared between the two input threads. For any given processing cycle, all N scalers may be assigned to one of the input threads or each input thread may be assigned a subset of the scalers. For example, the Input 1 thread may be processed in scalers 1-5 and the Input 2 thread may be processed in scaler N. Further, each of the N scalers performs vertical scaling before horizontal scaling. Note that no line buffers are present between the vertical scaling component and the horizontal component.

Figure 6:
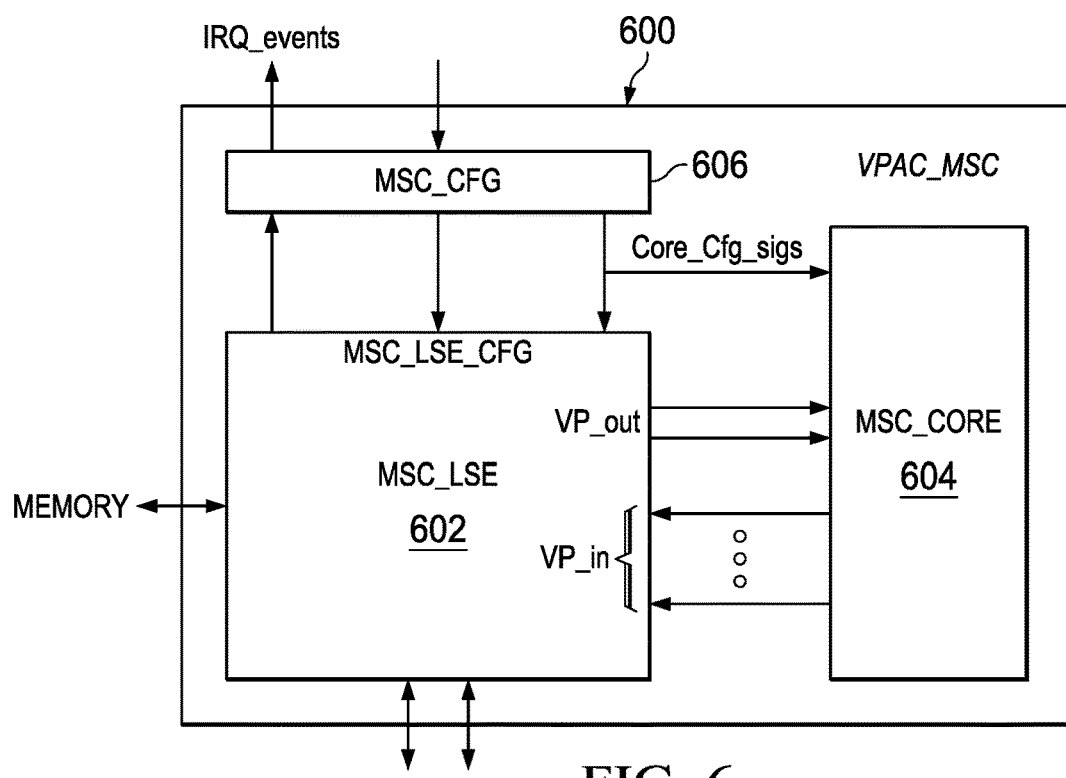
FIGS. 6 and 7 are block diagrams of an example architecture for a multi-thread image scaler with multiple scalers.
Figure 7:
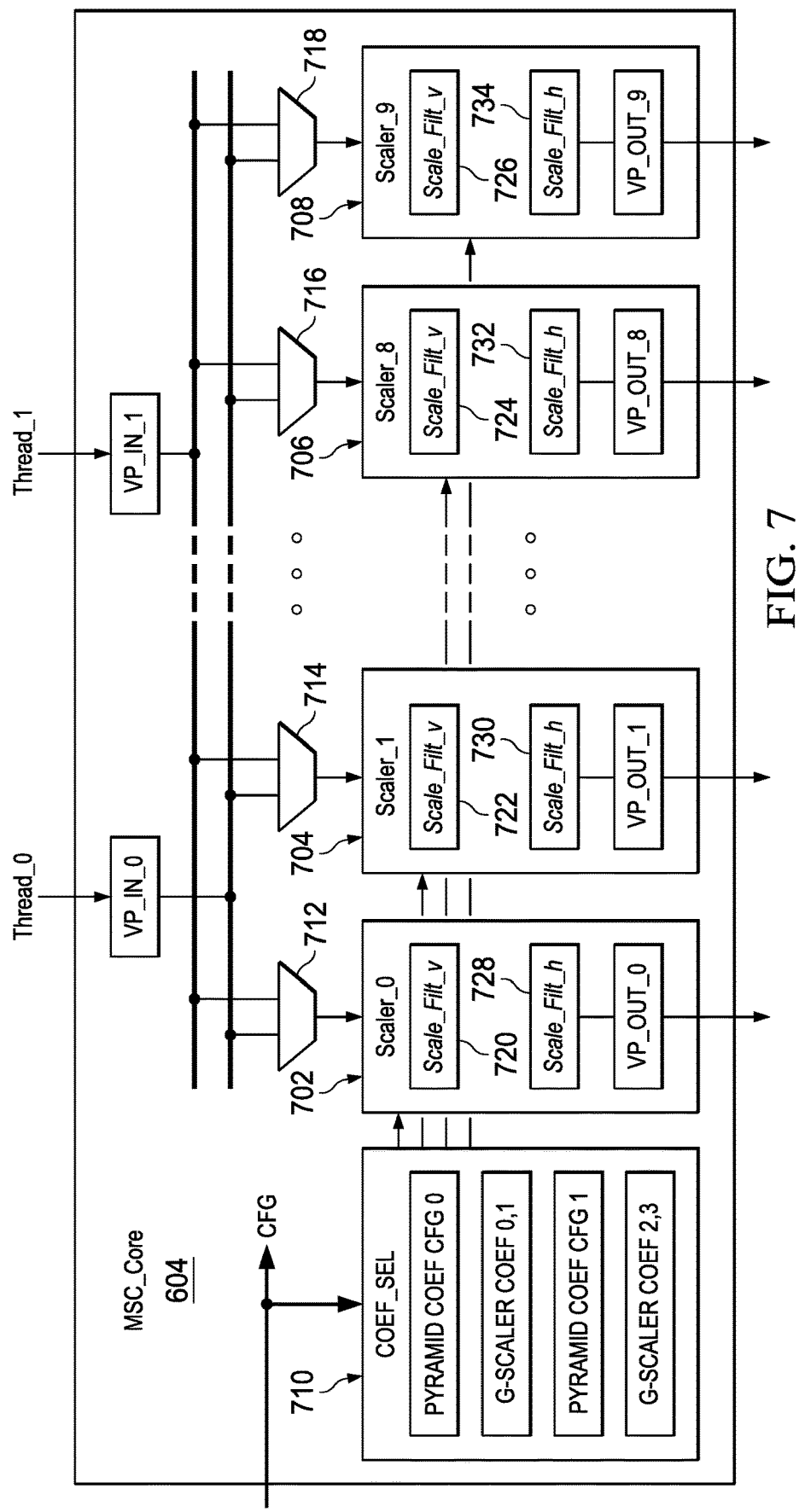

FIGS. 6 and 7 are block diagrams of an example architecture for a multi-thread image scaler with multiple scalers. The particular architecture depicted is an embodiment of the multi-scaler (MSC) hardware accelerator 600 of the vision pre-processing accelerator (VPAC) that may be included in ADAS integrated circuits (ICs) from Texas Instruments, Inc. High level descriptions of aspects of the VPAC_MSC 600 are provided herein. The VPAC_MSC 600 is described in more detail in M. Mody and B. Chae, "VPAC Multi-Scaler (MSC) HWA Module Specification," v0.8.0, Texas Instruments, Jul. 13, 2015, which is incorporated by reference herein.

In this example architecture, the number of input threads is two and the number of scalers is ten. One of ordinary skill in the art will understand embodiments in which there are more input threads and/or more or fewer scalers. The set of ten scalers is shared between the two input threads, e.g., one input thread can be mapped to N scalers and the other mapped to M scalers where N+M≤10. That is, two input threads can be processed simultaneously with each thread using a subset of the ten scalers or one input thread can use some or all ten scalers. Further, the input threads may be processed asynchronously. The input plane data for each processing thread is read from shared circular line buffers stored in memory external to the MSC 600. The results of the scaling operations are stored in shared circular line buffers in the external memory. Data transfers to and from the memory are handled by a DMA controller in the VPAC with transfer request events coming from a hardware thread scheduler in the VPAC.

As shown in FIG. 6, the MSC 600 includes a load store engine (MSC_LSE) 602, a configuration management component (MSC_CFG) 606, and a scaling component (MSC_CORE) 604. The configuration management component 606 provides an interface for programming the configuration registers for both the load store engine 602 and the scaling component 604. The configuration registers (MSC_LSE_CFG) for the load store engine 602 are part of the load store engine and the configuration registers for the scaling component 604 are part of the configuration management component 606.

The configuration registers for the scaling component 604 store a set of configuration parameters for each of the ten scalers. The configuration parameters for each scaler include a filter mode flag indicating whether single phase or multi-phase filtering is to be used, a phase mode flag indicating whether 32 or 64 phases are to be used, flags for selection of multi-phase vertical and horizontal filter coefficients, flags for selection of single phase vertical and horizontal filter coefficients, scaling factors, and initial phase offset value for the vertical and horizontal filters. The configuration registers for the load store engine 602 store parameters for each of the two input channels and each of the ten output channels. The parameters for each input channel include the size of the circular input buffer for the input channel, the base address of the buffer, the number of lines in the buffer, and the number of pixels in a line. The parameters for each output channel include a flag indicating the mapping of the channel to one of the two input threads, the size of the output circular buffer, and the base address of the output circular buffer.

The load store engine 602 manages the loading of input data from the input circular line buffers for the two processing threads to the scaling component 604 and the storing of output data from the scaling component 604 into the output circular line buffers in the memory. More specifically, the load store engine 602 includes functionality to manage two input channels for the scaling component 604, one for each of the two input threads. An input channel can be up to five lines of a frame, depending on the filter kernel used for scaling. The load store engine 602 also includes functionality to manage ten output channels, one for each of the ten scalers in the scaling component 604. Further, the load store engine 602 includes programmable thread mapping for each of the output channels, i.e., each output channel can be programmed to map to one of the processing threads. The load store engine 602 also includes functionality to synchronize with the hardware thread scheduler.

The scaling component 604 is configurable to perform two sets of asynchronous one-to-many scaling operations from two independent input sources. FIG. 7 is a block diagram of the scaling component 604. The scaling component 604 can receive one or two independent inputs from the load store engine 602 via the input ports VP_IN_0 and VP_IN_1. The output thread mapping parameter for each output channel of the load store engine 602 maps each of the scalers 702, 704, 706, 708 to one of the input ports by controlling the data select multiplexers 712, 714, 716, 718 coupled to the scalers.

Each of the scalers 702, 704, 706, 708 includes respective vertical scaling filters 720, 722, 724, 726, and horizontal scaling filters 728, 730, 732, 734. Each of the scaling filters is a programmable poly-phase filter supporting a maximum 5-tap kernel with either 64 or 32 phases. Each 5-tap filter can be programmed to perform 5-tap, 4-tap, or 3-tap filtering. For example, a 5-tap filter can be programmed as a 5-tap Gaussian filter for octave generation or a 4-tap bicubic downscaling filter for intra-octave scaled image generation. Vertical input edge padding is performed by the load store engine 602 and horizontal input boundary padding is performed in each of the horizontal scaling filters.

Shared coefficient sets for the scaling filters are stored in coefficient buffers 710 shared by the scaling filters. Any coefficient set may be used by any scaling filter. To enable efficient sharing of coefficient sets, the buffers 710 are implemented as registers in the MSC_Core 604. Sharing of coefficient sets is discussed in more detail herein in reference to FIG. 13. Each coefficient set consists of five coefficient values stored in two registers. There are two dedicated sets of 5-tap single phase filter coefficients for octave generation and integer resizing applications, Pyramid Coef CFG 0 and Pyramid Coef CFG 1. In addition, there are four sets of multi-phase coefficients for generic non-integer resizing, G-scaler Coef 0,1 and G-scaler Coef 2, 3. The multi-phase coefficients can be configured as four sets of 5-tapx32 phase coefficients, 1 set of 5-tapx64 phase coefficients and two sets of 5-tapx32 phase coefficients, or 2 sets of 5-tapx64 phase coefficients. The 32 phase configuration option allows the use of separate coefficient sets for vertical and horizontal scaling to achieve aspect ratio change during scaling. Selection of a coefficient set for a scaling filter is controlled by the coefficient selection parameters of the scaling filter.

Each of the scalers 702, 704, 706, 708 also includes respective output ports VP_OUT_0 . . . VP_OUT_9 coupled to respective output channels managed by the load store engine 602. In each of the scalers 702, 704, 706, 708, the input from the mapped input port is provided to the vertical scaling filter and the output of the vertical scaling filter is provided to the horizontal scaling filter. The output of the horizontal scaling filter is provided to the output port.

Figure 8A:
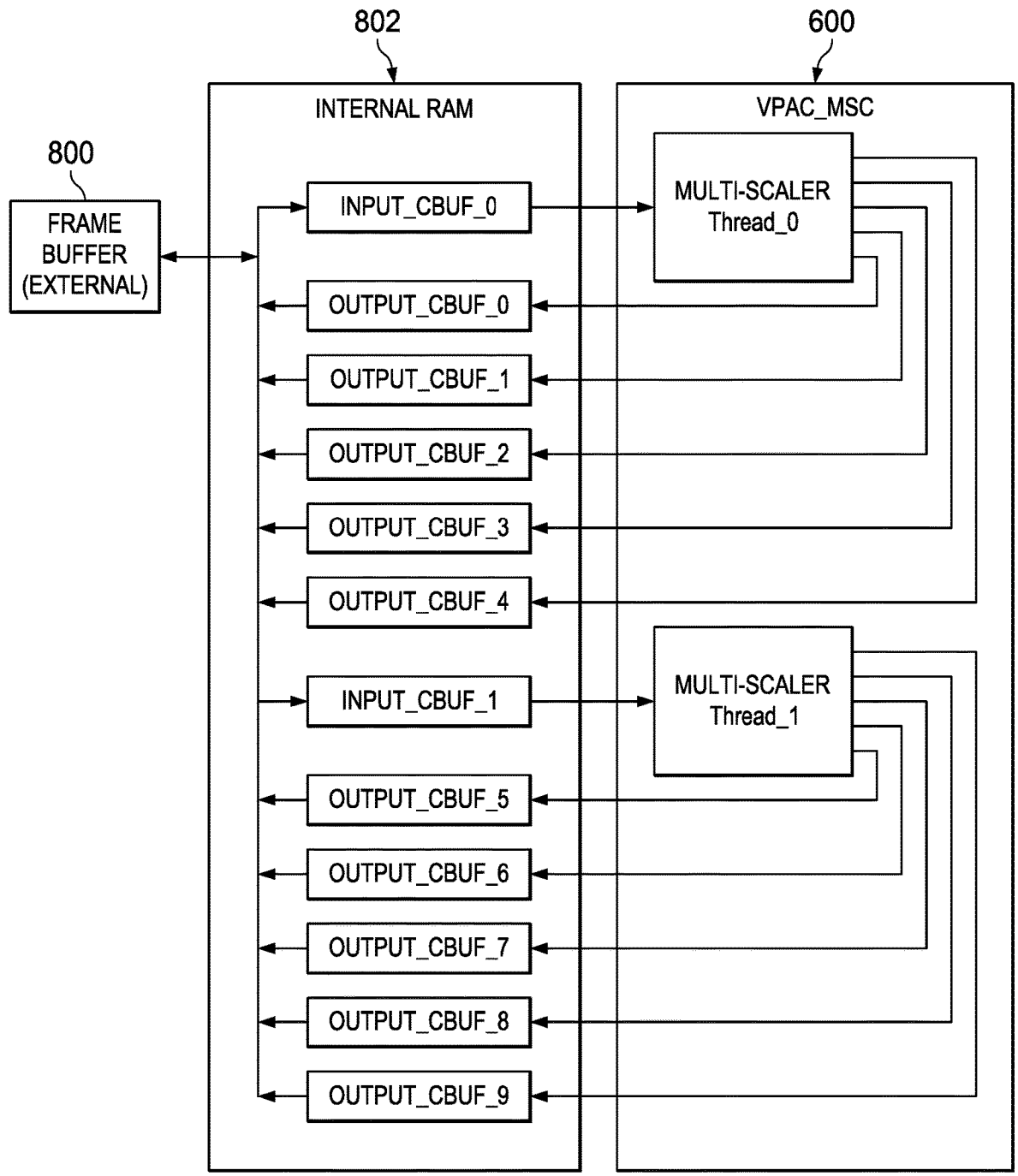
FIGS. 8A and 8B are example configurations of the architecture of FIGS. 6 and 7 for generating image pyramids.
Figure 8B:
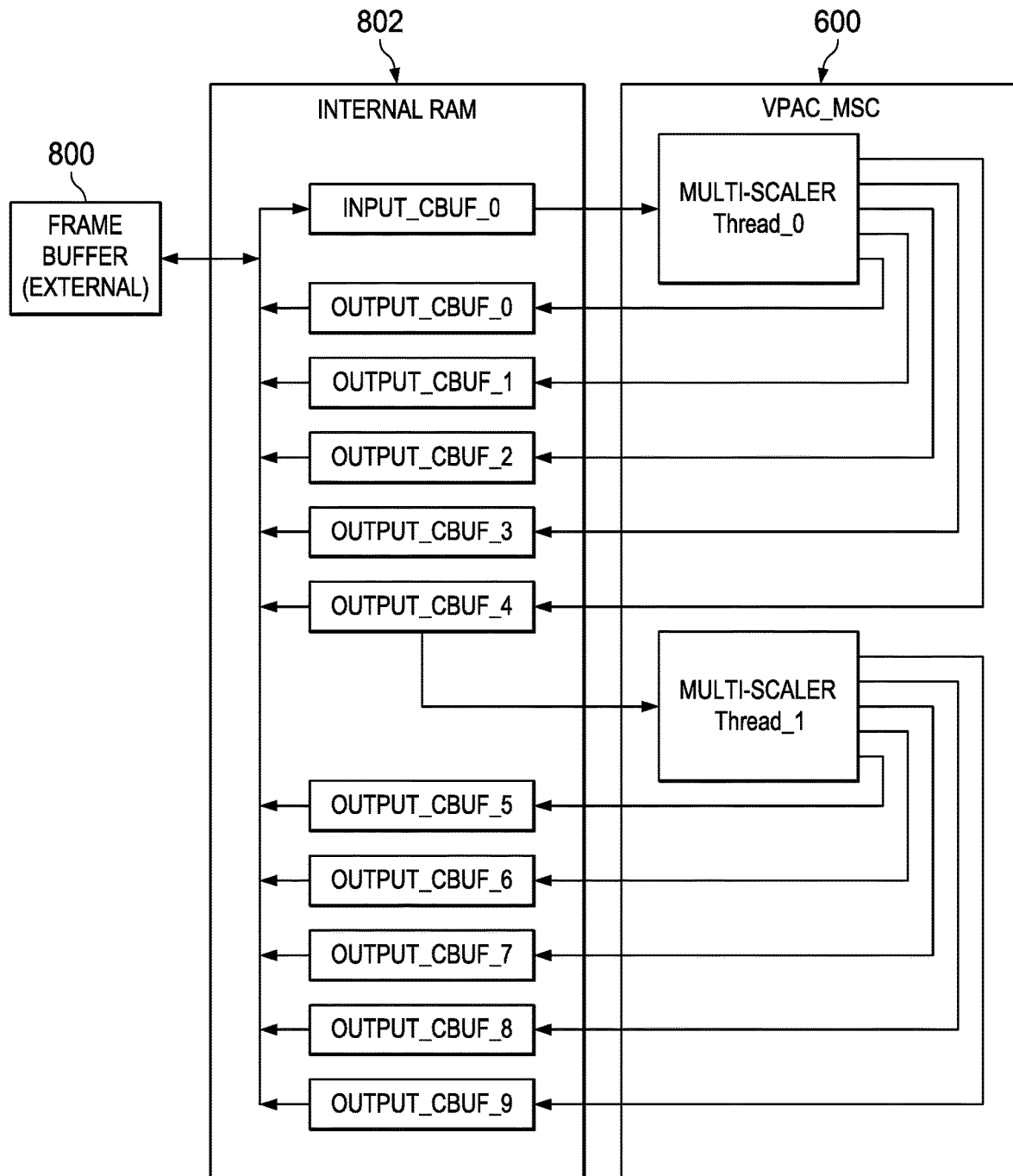

FIGS. 8A and 8B show example configurations of the MSC 600 for generating image pyramids. In these examples, the frame buffer 800 stores the input image(s), i.e., the image or images to be scaled and the scaled images output by the MSC 600. The internal random access memory 802 stores the input and output circular buffers for each processing thread, i.e., Thread_0 and Thread_1. In both of these examples, five scalers are assigned to each input thread. Thus, five output buffers Output_CBUF_x are assigned to each input thread.

Referring first to FIG. 8A, each input thread has a respective input circular buffer, Input_CBUF_0 and Input_CBUF_1 coupled to the frame buffer 800 to receive image data. Such a configuration may be used, for example, to generate an octave and four intra-octave scaled images at resolutions between the octave and the input image. The input image data may be from the same image or from different images. If the input image data is from different images, multiple scaling passes may be used to generate the successive octaves and corresponding intra-octave scaled images. In each scaling pass, the parameters of the scalers may be changed as needed.

This configuration may be used, for example, to generate an image pyramid in which all octaves of the pyramid and the corresponding intra-octave scaled images are generated from the base image, as illustrated in the example of FIG. 2. For each scaling pass, the base images in the frame buffer 800 will be the input images.

Figure 9:
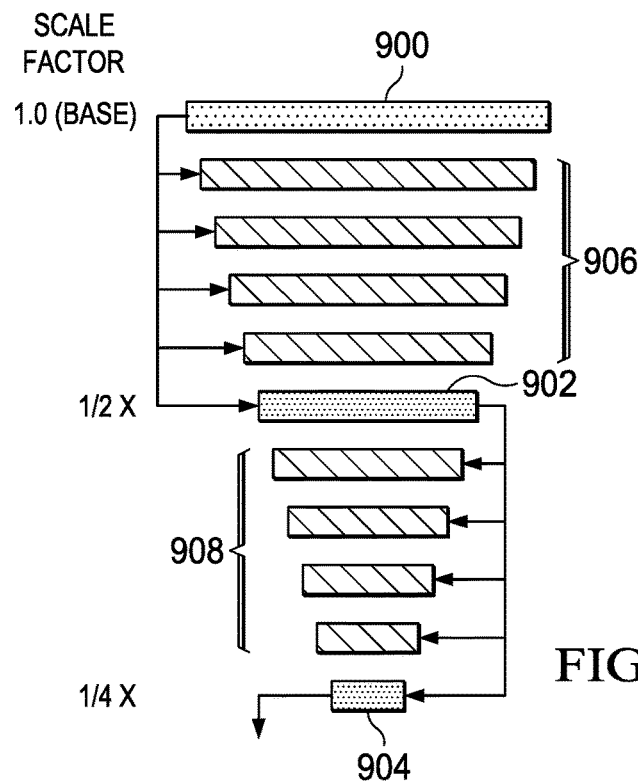
FIG. 9 is an example illustrating an approach to generating an image pyramid.

This configuration may also be used, for example, to perform a novel process for generating an image pyramid with intra-octave scaled images. In this process, an octave image is used to generate the next lower resolution octave image and the intra-octave scaled images between the two octaves. FIG. 9 is an example illustrating this process. The base image 900 is used to generate the next smaller octave 902 and the intra-octave scaled images 906. The octave 902 is then used to generate the next smaller octave 904 and the intra-octave scaled images 908. For this process, the input image for each scaling pass except the initial one will be the octave generated by the previous scaling pass.

Referring now to FIG. 8B, a cascaded configuration of the input threads is illustrated in which one of the output buffers for one input thread also serves as the input buffer for the other input thread. In this example configuration, input thread Thread_0 has an input circular buffer Input_CBUF_0 coupled to the frame buffer 800 to receive image data and input thread Thread_1 is coupled to an output circular buffer Output_CBUF_4 of Thread_0 to receive scaled image data from Thread_1 as input. In such a configuration, the output buffer also serving as an input buffer may be configured to hold the number of input lines needed by the scalers assigned to Thread_1, e.g., the buffer may be configured to hold five lines if the scalers assigned to Thread_1 are configured to use a 5-tap filter.

This configuration may be used, for example, to perform the scale from previous octave process illustrated in FIG. 9. For example, the scaled data in Output_CBUF_4 may be the octave data generated from the image data in Input_CBUF_0 and the scalers for Thread_1 may be configured to generate the next octave in the pyramid and the corresponding intra-octave scaled images. If more than two octaves are needed, multiple scaling passes may be used in which the octave output by the processing of Thread_2 is used as the input to Thread_0.

Figure 10:
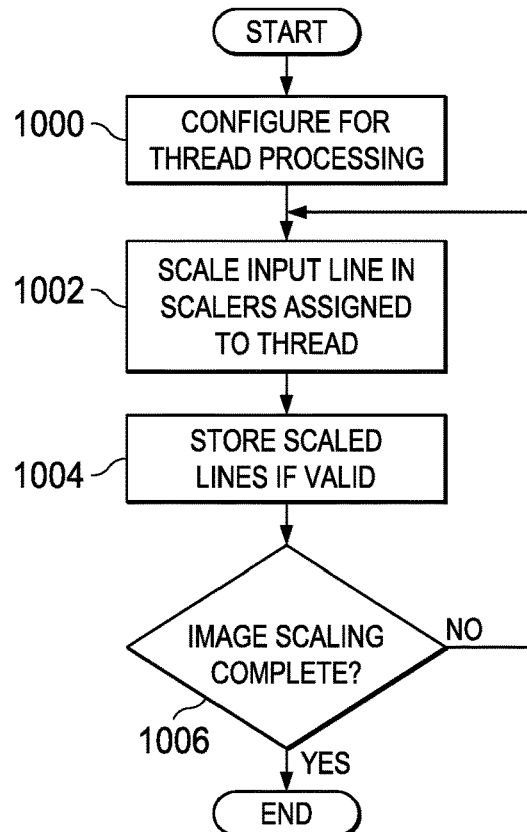
FIG. 10 is a flow diagram of a method for scaling an input image in a multi-thread image scaler with multiple scalers.

FIG. 10 is a flow diagram of a method for scaling an input image in a multi-thread image scaler with multiple scalers, e.g., the multi-thread image scaler of FIGS. 6 and 7. The flow diagram addresses scaling using a single thread. One of ordinary skill in the art will understand that input threads to the multi-thread image scaler may be processed asynchronously and the method may be repeated for additional input threads based on availability of scalers.

Initially, configuration 1000 is performed for thread processing. This configuration may include programming coefficient registers as needed, assigning N scalers to the thread, where N is the desired number of scalers for processing the input image, configuring the parameters of the filters in each of the N assigned scalers, and configuring the parameters of the input and output circular buffers. Once the configuration 1000 is complete, the configured scalers scale 1002 each input line of the input image according to the configured filter parameters and coefficients until scaling of the input image is complete 1006. Scaling of the input image is complete when all N scalers complete processing of the lines of the input image.

Assuming the multi-thread image scaler of FIGS. 6 and 7, in each configured scaler, each input line is scaled vertically by the vertical scaling filter. If the vertically scaled output line is valid, the vertically scaled output line is then horizontally scaled in the horizontal scaling filter. Output pixels of the horizontal scaling filter are stored 1004 in the corresponding output buffer if the resulting scaled line is valid. One of ordinary skill in the art will understand that certain pixels in an image may be dropped as part of downscaling, resulting in invalid output lines. Scaling of an input line is complete when all N scalers complete processing of the input line and any valid output of the scaling is written to the respective scaler output buffer.

Figure 11:
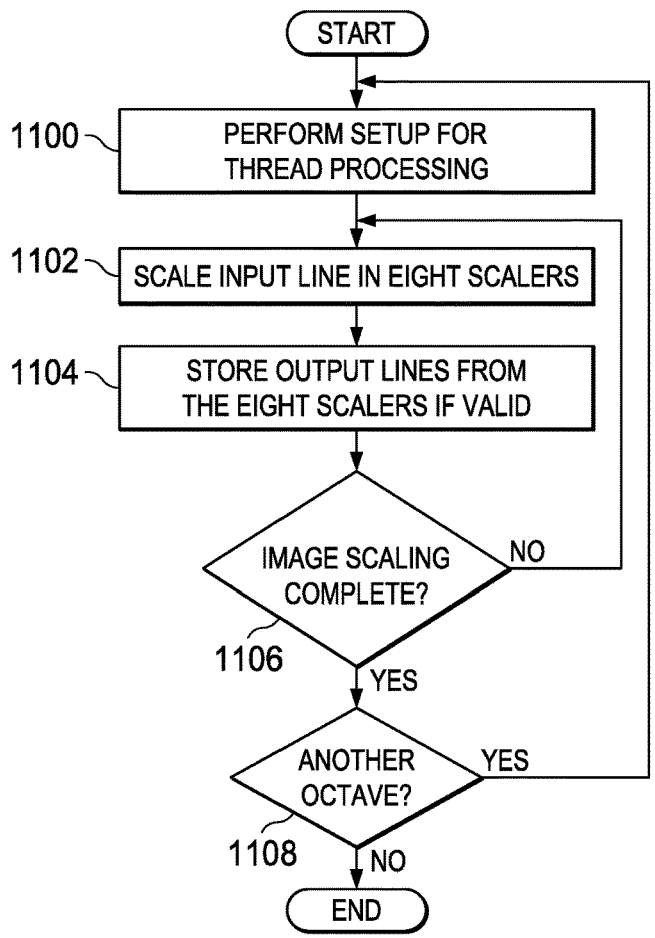
FIG. 11 is a flow diagram of method for generating an image pyramid using scaling from a previous octave.

FIG. 11 is a flow diagram of a method for generating an image pyramid using scaling from a previous octave as illustrated in the example of FIG. 9. The method assumes that a multi-thread image scaler with multiple scalers, e.g., the multi-thread image scaler of FIGS. 6 and 7, is used. One of ordinary skill in the art will understand embodiments for a single thread image scaler having multiple scalers. The method assumes a typical image pyramid having six or seven octaves with seven intra-octave scaled images. One of ordinary skill in the art will understand embodiments with more or few octaves and/or intra-octave scaled images. The method also assumes that there are at least eight scalers.

Initially, configuration 1100 is performed for thread processing such that the resulting output of the scaling is an octave of the image pyramid and corresponding intra-octave scaled images. This configuration may include programming coefficient registers as needed, assigning eight scalers to the thread, configuring the parameters of the filters in each of the eight assigned scalers, and configuring the parameters of the input circular buffer and eight output circular buffers. For the initial scaling pass, the input image is the base image and the output octave is the next octave in the image pyramid.

Once the configuration 1100 is complete, the eight configured scalers scale 1102 each input line of the input image according to the configured filter parameters and coefficients until scaling of the input image is complete 1106. Scaling of the input image is complete when all eight scalers complete processing of the lines of the input image. Scaling of an input line is complete when all eight scalers complete processing of the input line and any valid output of the scaling is written to the respective scaler output buffer.

If all desired octaves have been generated 1108, processing terminates. Otherwise, the next octave is generated along with the corresponding intra-octave scaled images 1100-1106. The input image for generating each successive octave and corresponding intra-octave scaled images is the previous octave.

Note that if the above method is used in the multi-thread image scaler of FIGS. 6 and 7, the second input thread and two scalers remain available for other image processing. For example, the second input thread and the remaining scalers can be used to enable pyramid generation for other input data or pyramid generation for chroma data as long as the total number of scales needed by both threads is ten or less.

Figure 12:
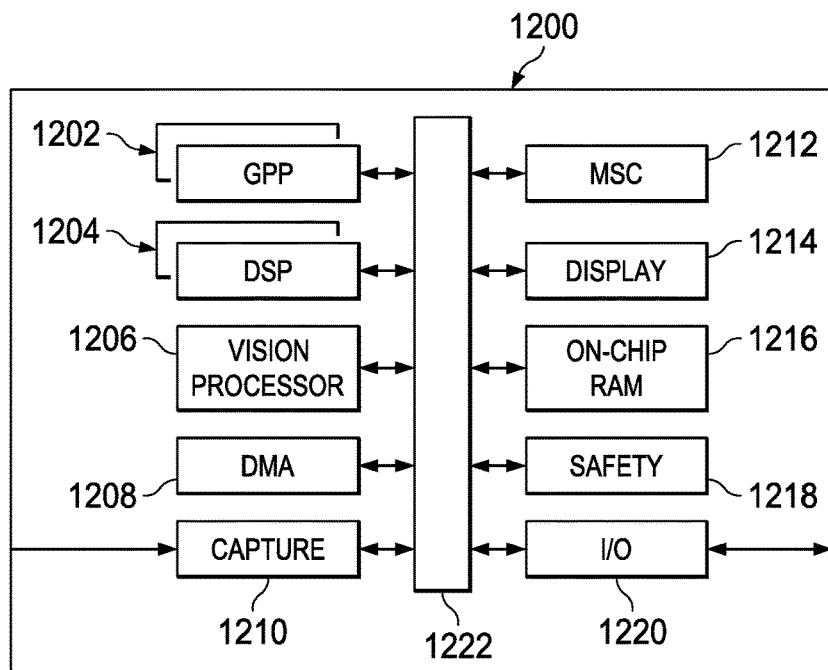
FIG. 12 is a high level block diagram of an example multi-processor system-on-a-chip (SOC) that includes a multi-thread image scaler with multiple scalers.

FIG. 12 is a high level block diagram of an example multi-processor system-on-a-chip (SOC) 1200 configured for use in a camera-based ADAS that includes a multi-thread image scaler (MSC) 1212 with multiple scalers. A high level description of the components of the SOC 1200 is provided herein. A more detailed description of example components (except the MSC 1212) may be found in M. Mody, et al., "High Performance Front Camera ADAS Applications on TI's TDA3X Platform," Proceedings of 2015 IEEE $22^{nd}$ International Conference on High Performance Computing, Dec. 16-19, 2015, Bangalore, India, pp. 456-463, which is incorporated by reference herein.

The SOC 1200 includes dual general purpose processors (GPP) 1202, dual digital signal processors (DSP) 1204, and a vision processor 1206 coupled via a high speed interconnect 1222. The SOC 1200 further includes a direct memory access (DMA) component 1208, a camera capture component 1210, a display management component 1214, on-chip random access (RAM) memory 1216, and various input/output (I/O) peripherals 1220 all coupled to the processors via the interconnect 1222. In addition, the SOC 1200 includes a safety component 1218 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures.

The MSC 1212 has multiple thread inputs and multiple scalers that may be partitioned among the input threads. Examples of hardware architectures for such an MSC have been previously described herein. In some embodiments, the MSC 1212 may be a standalone hardware accelerator. In some embodiments, the MSC 1212 may be part of a vision pre-processing hardware accelerator such as the MSC 600 of FIGS. 6 and 7. In some embodiments, the MSC 1212 may be software that executes on one or more of the GPP 1202, the DSP 1204, and the Vision Processor 1206. Software controlling the operation of the MSC 1212 may execute on any programmable processor of the SOC 1200.

As previously mentioned, the two single phase coefficient sets and the four multi-phase coefficient sets are shared by the ten scalers of the scaling component 604 illustrated in FIG. 7. Typical usage of the scaling component is to generate image pyramids of up to eight levels with downscaling ratios between 1x and 0.5x used to generate the intra-octave scaled images. Because the downscaling ratios are marginally different from each other, i.e., in multiples of approximately 1.09x, shared sets of common coefficient values each supporting a sub-range within these ratios are sufficient for image pyramid generation for computer vision applications. The coefficient sets may be shared by the scalers when processing a single input thread or when processing two input threads.

Figure 13:
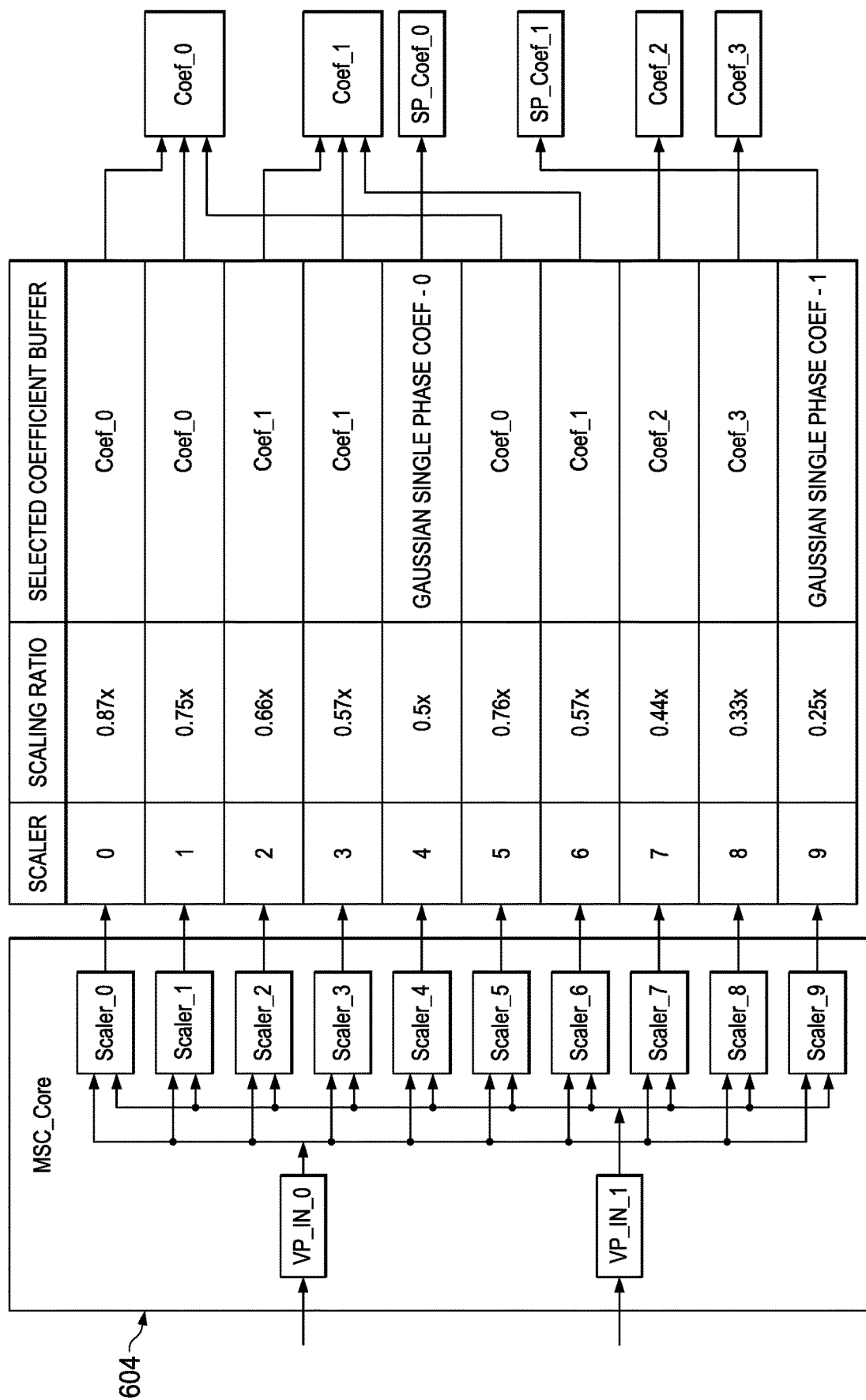
FIG. 13 is an example illustrating sharing of coefficient sets among scaling filters.

FIG. 13 is an example illustrating sharing of coefficient sets between two input threads in the scaling component 604. In this example, Coef_0, Coef_1, Coef_2, and Coef_3 are the four shared sets of multi-phase coefficients and SP_Coef_0 and SP_Coef_1 are the two shared sets of single phase coefficients. Each multi-phase coefficient set is programmed to support a different scaling ratio. For example, COEF_0 may support a scaling ratio of 1x-0.75x, COEF_1 may support a scaling ratio of 0.75x-0.5x, COEF_2 may support a scaling ratio of 0.5x-0.35x, and COEF_3 may support a scaling ratio of 0.35x-0.25x.

Scaler_0, Scaler_1, Scaler_2, Scaler_3, and Scaler_4 are assigned to one input thread and the remaining scalers are assigned to the other input thread. As illustrated in the table, Scaler_0, Scaler_1, Scaler_2, and Scaler_3 are each configured to generate an intra-octave scaled image using one of multi-phase coefficient sets and Scaler_4 is configured to generate an octave using one of the single phase coefficient sets. Similarly, Scaler_5, Scaler_6, Scaler_7, and Scaler_8 are each configured to generate an intra-octave scaled image using one of the multi-phase coefficient sets and Scaler_9 is configured to generate an octave using the other single phase coefficient set. Note that Scaler_0, Scaler_1, and Scaler_5 are configured to use the same multi-phase coefficient set, Coef_0, and Scaler_2, Scaler_3, and Scaler_6 are configured to use the same multi-phase coefficient set, Coef_1.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the vertical and horizontal scaling is performed using a polyphase filter. One of ordinary skill in the art will understand embodiments in which other suitable filtering techniques are used, such as, for example, bilinear filtering, bicubic filtering, Lancoz filtering, Gaussian filtering, etc. Further, one of ordinary skill in the art will understand embodiments in which more than one filtering technique is used.

In another example, embodiments have been described herein in which coefficient sets are shared among the scalers. One of ordinary skill in the art will understand embodiments in which each scaler has separate dedicated storage for coefficients. Further, one of ordinary skill in the art will understand embodiments having more or fewer shared coefficient sets.

In another example, embodiments have been described herein in which each scaler performs vertical filtering before horizontal filtering. One of ordinary skill in the art will understand embodiments in which the filtering order is reversed.

In another example, embodiments have been described herein with a focus on downscaling of images. One of ordinary skill in the art will understand embodiments in which the scalers may also be used for up-scaling of images, perspective transformation, noise filtering, etc.

In another example, embodiments have been described herein in reference to ADAS. One of ordinary skill in the art will understand embodiments for computer vision applications other than ADAS, such as, for example, industrial applications, robotics, and drones.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. An integrated circuit (IC) comprising:
a first input port configured to receive an image; and
a hardware processor that, upon executing software, implements a plurality of scalers, wherein each scaler of the plurality of scalers comprises a vertical scaling filter configured to vertically scale each line of the image; and a horizontal scaling filter coupled to the vertical scaling filter to receive each vertically scaled line output by the vertical scaling filter, the horizontal scaling filter configured to horizontally scale each vertically scaled line,
wherein the hardware processor is configured to:
map a first subset of the plurality of scalers to the first input port, wherein each scaler of the first subset is individually mapped to the first input port based on configuration parameters for that scaler; and
use the first subset of scalers to iteratively generate each octave and corresponding intra-octave scaled images of an image pyramid for a base input image, wherein to generate an octave and corresponding intra-octave scaled images, one scaler of the first subset of scalers is configured to generate the octave from the image and each scaler of remaining scalers in the first subset of scalers is configured to generate a respective intra-octave scaled image from the image, wherein in an initial iteration, an initial octave of the image pyramid and corresponding intra-octave scaled images are generated from the image, wherein the image is the base input image, and in each subsequent iteration, a next octave of the image pyramid and corresponding intra-octave scaled images are generated from the image, wherein the image is a previously generated octave.

2. The IC of claim 1, wherein each vertical scaling filter and each horizontal scaling filter implements a respective programmable polyphase filter, and wherein the hardware processor is further configured to implement a plurality of coefficient buffers configured to store respective coefficient sets for use by the programmable polyphase filters, wherein any programmable polyphase filter of the programmable polyphase filters can be configured to use any coefficient set of the coefficient sets and more than one programmable polyphase filter can be configured to use a same coefficient set of the coefficient sets, wherein at least one coefficient buffer is configured to store single phase filter coefficients and at least one coefficient buffer is configured to store multi-phase filter coefficients.

3. The IC of claim 2, wherein the one scaler uses single phase filter coefficients to generate an octave and the remaining scalers use multi-phase filter coefficients to generate the respective intra-octave scaled images.

4. The IC of claim 1, further including a second input port configured to receive a second image, and the hardware processor is configured to:
map a second subset of the plurality of scalers to the second input port, wherein each scaler of the second subset is individually mapped to the second input port based on configuration parameters for that scaler;
configure each scaler of the second subset to scale the second image; and
scale the second image in each scaler of the second subset, wherein the scalers of the second subset operate in parallel or asynchronously to the scalers of the first sub set.

5. The IC of claim 4, wherein the second image is the base input image.

6. An integrated circuit (IC) comprising:
a first input port configured to receive an image; and
a hardware processor that, upon executing software, implements a plurality of scalers, wherein each scaler of the plurality of scalers comprises a vertical scaling filter configured to vertically scale each line of the image; and a horizontal scaling filter coupled to the vertical scaling filter to receive each vertically scaled line output by the vertical scaling filter, the horizontal scaling filter configured to horizontally scale each vertically scaled line, wherein the hardware processor is configured to:
use a first subset of the plurality of scalers to iteratively generate each octave and corresponding intra-octave scaled images of an image pyramid for a base input image, wherein to generate an octave and corresponding intra-octave scaled images, one scaler of the first subset of the plurality of scalers is configured to generate the octave from the image and each scaler of remaining scalers in the first subset of the plurality of scalers is configured to generate a respective intra-octave scaled image from the image, wherein in an initial iteration, an initial octave of the image pyramid and corresponding intra-octave scaled images are generated from the image, wherein the image is the base input image, and in each subsequent iteration, a next octave of the image pyramid and corresponding intra-octave scaled images are generated from the image, wherein the image is a previously generated octave.

7. The IC of claim 6, wherein the hardware processor is configured to map the first subset of the plurality of scalers to the first input port.

8. The IC of claim 6, wherein each vertical scaling filter and each horizontal scaling filter implements a respective programmable polyphase filter, and wherein the hardware processor is further configured to implement a plurality of coefficient buffers configured to store respective coefficient sets for use by the programmable polyphase filters, wherein any programmable polyphase filter of the programmable polyphase filters can be configured to use any coefficient set of the coefficient sets and more than one programmable polyphase filter can be configured to use a same coefficient set of the coefficient sets, wherein at least one coefficient buffer is configured to store single phase filter coefficients and at least one coefficient buffer is configured to store multi-phase filter coefficients.

9. The IC of claim 8, wherein the one scaler uses single phase filter coefficients to generate an octave and the remaining scalers use multi-phase filter coefficients to generate the respective intra-octave scaled images.

10. The IC of claim 6, further including a second input port configured to receive a second image, the hardware processor configured to:
map a second subset of the plurality of scalers to the second input port, wherein each scaler of the second subset is individually mapped to the second input port based on configuration parameters for that scaler;
configure each scaler of the second subset to scale the second image; and
scale the second image in each scaler of the second subset, wherein the scalers of the second subset operate in parallel or asynchronously to the scalers of the first sub set.

11. The IC of claim 10, wherein the second image is the base input image.

* * * * *